United States Patent [19]

Olov Roos

[11] 3,726,352
[45] Apr. 10, 1973

[54] MEANS FOR CLAMPING CUTTING INSERTS IN A DRILL

[75] Inventor: Axel Sven Olov Roos, Sandviken, Sweden

[73] Assignee: Sandvik Aktiebolag, Sandviken, Sweden

[30] Foreign Application Priority Data
Nov. 24, 1969 Sweden..................16081/69

[22] Filed: Nov. 20, 1970

[21] Appl. No.: 91,297

[52] U.S. Cl..................175/413, 299/93
[51] Int. Cl...............................E21c 13/00
[58] Field of Search..............175/406, 412, 413; 299/91, 93

[56] References Cited
UNITED STATES PATENTS

| 3,429,617 | 2/1969 | Lauber | 299/93 |
| 2,452,081 | 10/1948 | Sullinger | 299/93 |
| 2,211,525 | 8/1940 | Stenger et al. | 299/93 |
| 1,487,217 | 3/1924 | Dillon | 299/93 |
| 936,793 | 10/1909 | Middleton | 299/93 X |

Primary Examiner—Marvin A. Champion
Assistant Examiner—Terrell P. Lewis
Attorney—Pierce, Scheffler & Parker

[57] ABSTRACT

The cutting inserts of a rotary drill are secured to the drill head by means of clamps which attach the inserts on support bodies laterally projecting from the drill body.

1 Claim, 3 Drawing Figures

MEANS FOR CLAMPING CUTTING INSERTS IN A DRILL

The present invention relates to drills in which cutting inserts are fastened by clamping. In previous drills of this type it takes a long time to replace the inserts because the clamping means are not well accessible. The invention solves this problem by providing a separate support body for the insert which is clamped by a screw that is accessible from the front side of the drill.

Figure 1:
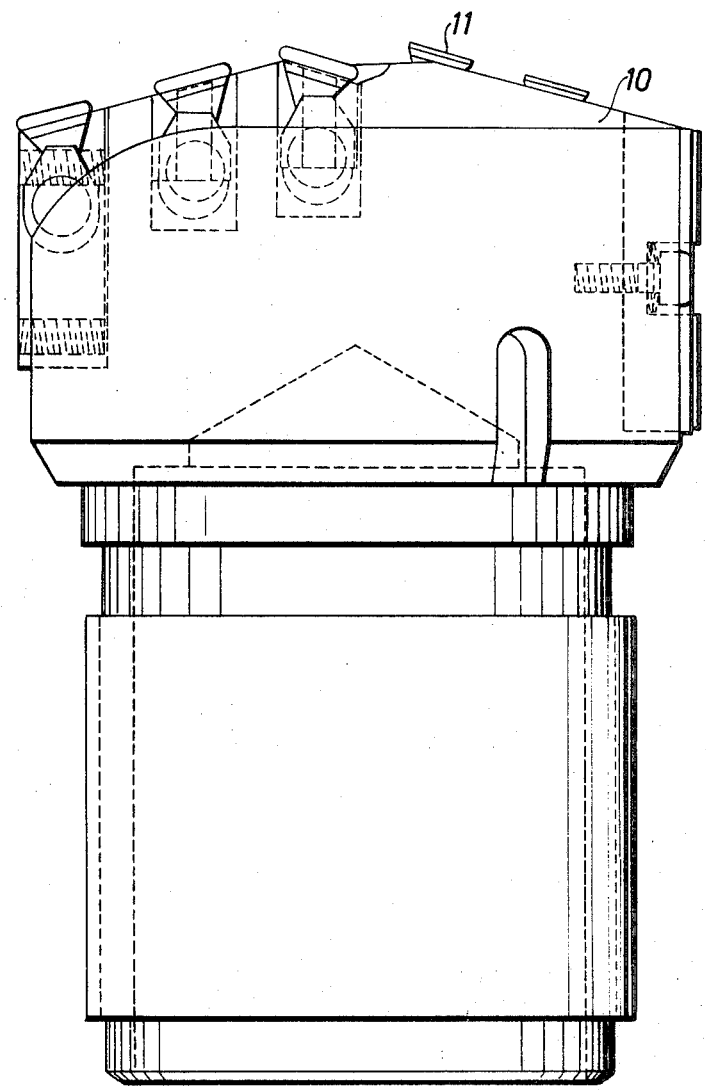

The invention is closer described in the following specification with drawings showing:

FIG. 1, a side view of a metal drill according to the invention.

Figure 2:
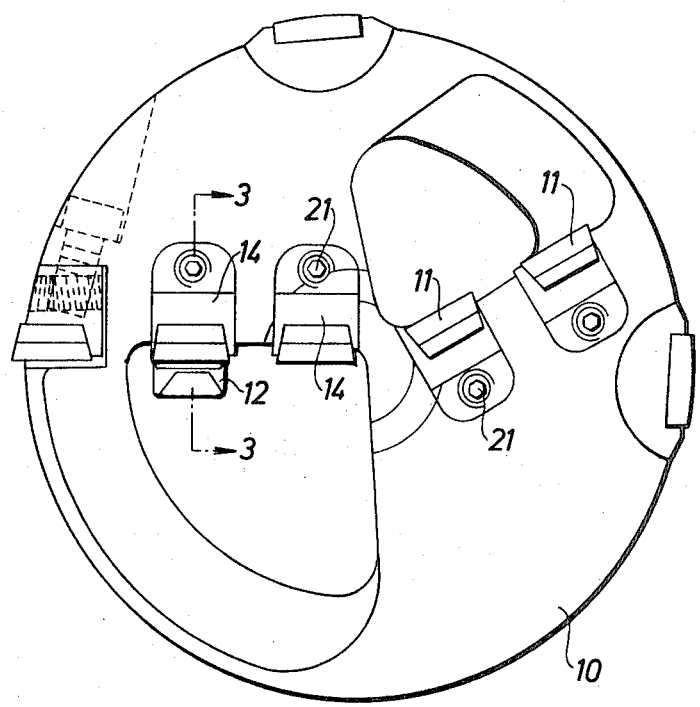

FIG. 2, an end view of the drill in FIG. 1.

Figure 3:
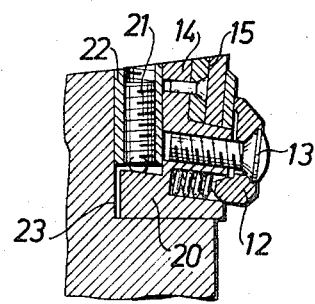

FIG. 3, a section through a cutting insert unit on the line 3—3 in FIG. 2.

The drill 10 shown in FIGS. 1 and 2 has a number of cutting inserts 11 of a wear material, usually sintered carbide. Clamping means comprising a jaw 12 and a screw 13 are arranged to clamp the insert in a support body 14, having an insert site with a bottom surface 15 and two edge surfaces matching the triangular shape of the insert.

The lower part of the support body, opposite to the insert site, has a projection 20 entering into a recess 23 in the drill. Above the recess there is a screw 21 running in an internal thread within the portion 22 which forms a separate piece that is attached by brazing or welding. The portion 22 should not be integral with the drill because then it would be practically impossible to machine the recess 23. The support body 14 is clamped by tensioning the screw 21 against the projection 20. The screw 21 has an internal hexagonal grip which is accessible from the front end of the drill for turning the screw. This grip may of course be substituted by for instance a slot or a polygonal head.

For replacing a worn or damaged insert the unit comprising the insert 11 and the support body 14 is removed after loosening the screw 21 and is replaced by a similar unit in which an insert has been mounted on beforehand. As the screws are easily accessible from the front surface of the drill, the standstill time is reduced in comparison with previous drills.

A further advantage of the support body is that if the insert site should be damaged only the support body needs replacing, while in previous drills the whole drill head had to be replaced.

I claim:

1. Rotary drill for metal drilling, which comprises
    a drill head having a transverse front surface and a longitudinal surface,
    said longitudinal surface defining a space for chip removal;
    a number of cutting inserts disposed along the junction between said front surface and longitudinal surface,
    each cutting insert being clamped in a support body having a longitudinal contact surface and from said surface a laterally extending projection,
    said longitudinal surface of the drill head having a first lateral recess that is open forwardly and in said first recess a second lateral recess that is closed forwardly,
    the said first recess having a longitudinal contact surface abutting against the longitudinal contact surface on said support body,
    the lateral projection on the support body entering into the second recess;
    a clamping screw extending from the front surface and holding said projection clamped in said second recess,
    the insert being clamped in the support body by independent clamping means,
    the support body and the clamped insert forming an assembly removable from said drill as a unit.

* * * * *